US010826404B2

(12) United States Patent
Chung et al.

(10) Patent No.: US 10,826,404 B2
(45) Date of Patent: Nov. 3, 2020

(54) BIAS CONTROL IN A VOLTAGE CONVERTER

(71) Applicant: INFINEON TECHNOLOGIES AUSTRIA AG, Villach (AT)

(72) Inventors: Po-Jung Chung, Taipei (TW); Martin Krueger, Oberschleißheim (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/352,156

(22) Filed: Mar. 13, 2019

(65) Prior Publication Data
US 2020/0295666 A1    Sep. 17, 2020

(51) Int. Cl.
*H02M 3/335*    (2006.01)
*H02M 1/08*     (2006.01)

(52) U.S. Cl.
CPC ......... *H02M 3/33592* (2013.01); *H02M 1/08* (2013.01)

(58) Field of Classification Search
CPC .............................. H02M 3/33592; H02M 1/08
See application file for complete search history.

(56) References Cited

U.S. PATENT DOCUMENTS

| 7,525,819 B2* | 4/2009 | Choi | H02M 3/335 363/16 |
|---|---|---|---|
| 2008/0298095 A1 | 12/2008 | Chuang et al. | |
| 2017/0033586 A1* | 2/2017 | Weidner | H02J 7/00034 |
| 2018/0342955 A1* | 11/2018 | Tsai | H02M 1/08 |

OTHER PUBLICATIONS

Extended Eurapean Search Report, EP 29 15 9956.0, dated Aug. 24, 2020, pp. 1-14.

\* cited by examiner

*Primary Examiner* — Adolf D Berhane
*Assistant Examiner* — Afework S Demisse
(74) *Attorney, Agent, or Firm* — Armis IP Law, LLC

(57) ABSTRACT

A power supply as described herein includes a voltage converter, main controller, and a bias controller. The voltage converter including a primary stage and a secondary stage. The controller is operable to control regulation of an output voltage from the secondary stage based on a received feedback signal. As its name suggests, the output voltage from the secondary stage powers a load. During certain load conditions, the bias controller maintains (via novel biasing) a magnitude of a power supply voltage above a bias threshold value. More specifically, the bias controller is operable to prevent the power supply voltage from falling below the bias threshold value, preventing an under voltage lockout condition such that the controller is able to quickly continue conveyance of sufficient energy from the first stage to the second stage when the load increases a rate of consuming power provided by the output voltage.

30 Claims, 6 Drawing Sheets

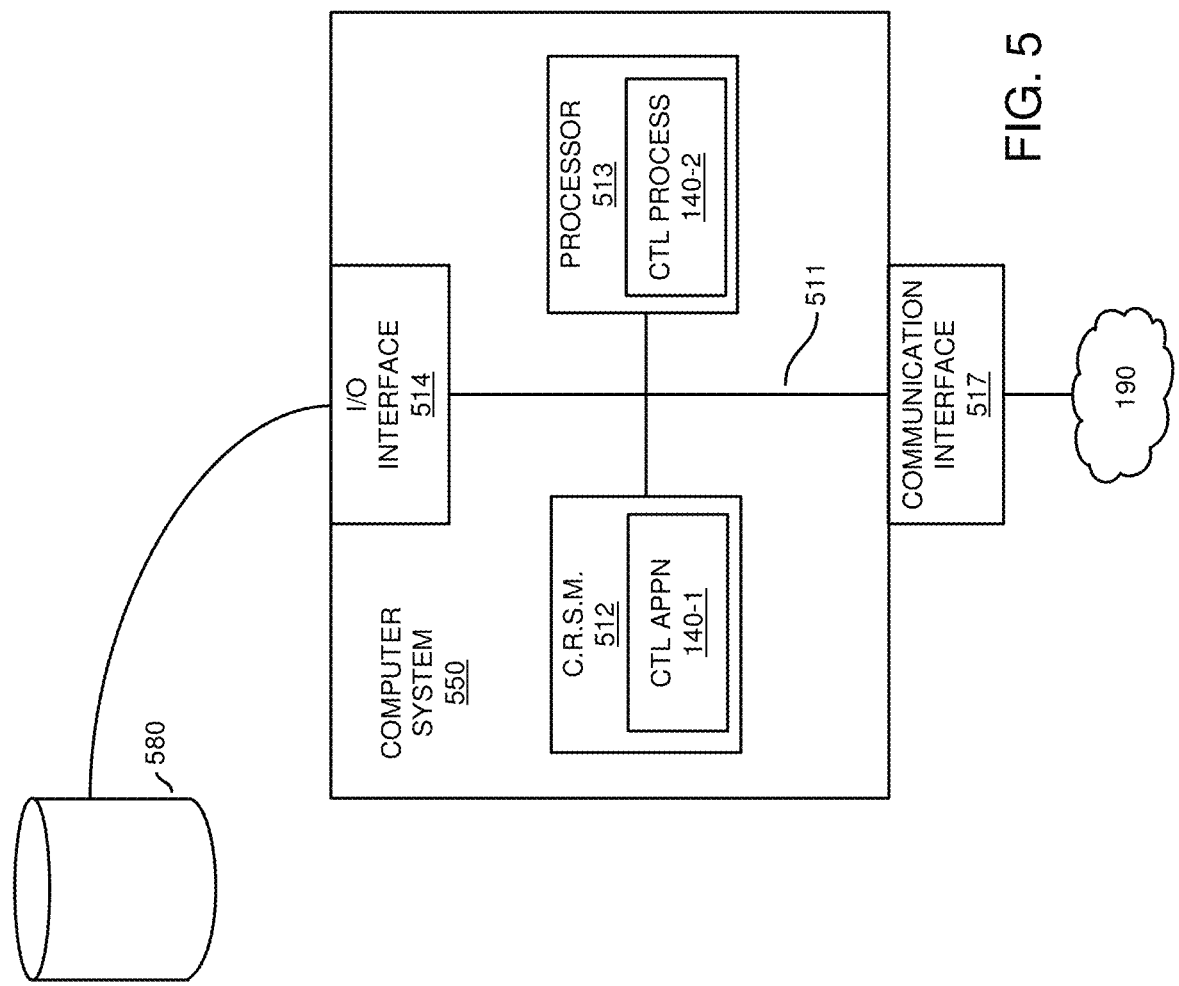

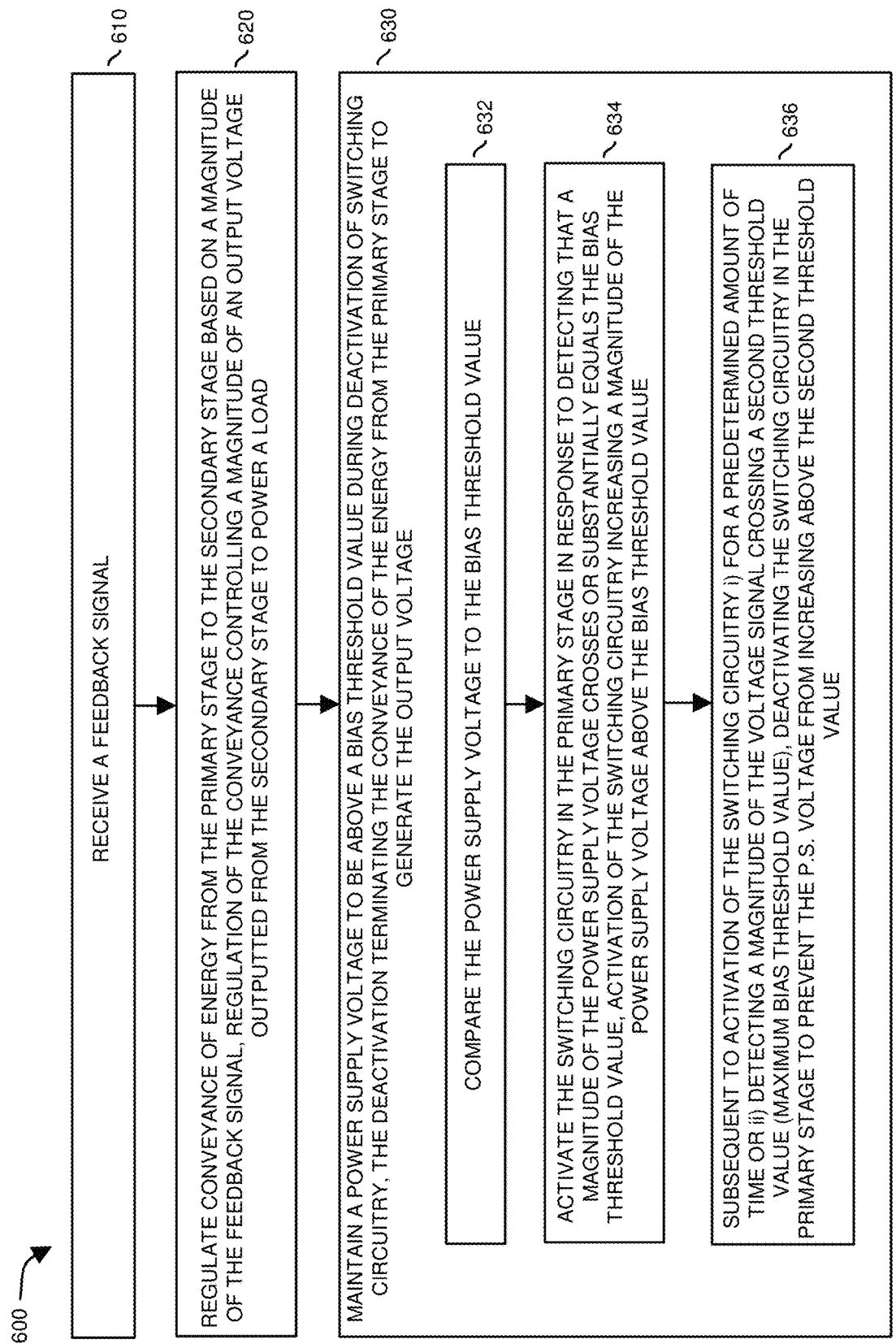

BIAS CONTROL IN A VOLTAGE CONVERTER

BACKGROUND

As its name suggests, a conventional voltage converter converts a received input voltage into a corresponding output voltage to power a load.

Certain power supplies include a primary winding, secondary winding, and an auxiliary winding to produce the output voltage. A voltage signal generated by the primary winding can be used as a basis to produce a power supply voltage to power one or more components. When a controller discontinues inputting energy to the primary winding, the power supply voltage produced by the auxiliary winding is prone to decreasing in magnitude as a result of leakage or current draw caused by components in the voltage converter coupled to the auxiliary winding.

BRIEF DESCRIPTION

This disclosure includes the observation that conventional power converters can be improved to provide operation under a wider variety of conditions such as during a deep load dropout when a respective load consumes little current. Embodiments herein include novel ways of providing improved performance of a voltage converter and maintaining a power supply voltage above a threshold value even during conditions when little or no power is consumed by a load.

More specifically, an apparatus (such as a power supply) as described herein includes a voltage converter, main controller, and a bias controller. The voltage converter includes a primary stage and a secondary stage. The controller is operable to control regulation of an output voltage from the secondary stage. As its name suggests, the output voltage outputted from the secondary stage powers a load. In one embodiment, the voltage converter also produces a power supply voltage from a source such as the primary winding. During certain load conditions (such as during low power consumption when little or no energy is inputted to the primary winding to increase a magnitude of the output voltage), the power supply voltage powering the controller is prone to decreasing such as due to lack of energy inputted to the primary winding and leakage or current draw caused by components in the voltage converter coupled to the auxiliary winding or other circuitry. The bias controller as described herein is operable to maintain (via novel biasing) a magnitude of the power supply voltage above a bias threshold value such that the power supply voltage is maintained above a threshold value to supply power to the controller even when no current is inputted to the primary winding.

In one embodiment, the bias controller is operable to prevent the power supply voltage (potentially referred to as a bias voltage, voltage rail, etc.) from falling below a minimum bias threshold value such that the controller is able to avoid a lockout mode (such as Vcc below a minimum threshold value) and, because the controller is still powered by the properly regulated power supply voltage, quickly communicate sufficient energy from the first stage to the second stage when the load increases a rate of consuming power provided by the output voltage.

Note that any of the components as described herein such as the voltage converter, main controller, bias controller, etc., can be instantiated in any suitable manner. For example, in one embodiment, each of the voltage converter, controller, and the bias controller are instantiated as digital and/or analog electronic circuitry. Note further that any of one or more of the components of the power supply such as the voltage converter, main controller, bias controller, etc., can be implemented as hardware (such as circuitry), software, or a combination of both hardware and software.

In one nonlimiting example embodiment, the voltage converter includes a transformer including multiple windings. The primary stage includes a primary winding and an auxiliary winding. In such an instance, the primary winding is operable to convey energy received from an input voltage to a secondary winding of the transformer. The auxiliary winding is operable to generate the power supply voltage, which is biased by the bias controller during low current consumption modes.

During a first mode in which the load consumes power from the output voltage above a threshold level, the magnitude of the power supply voltage is regulated properly above a threshold value due to energy inputted to the primary winding. Conversely, during a second mode in which the load consumes power from the output voltage below the threshold level, the bias controller is operable to apply a bias to the power supply voltage to maintain the magnitude of the power supply voltage above a (minimum) bias threshold value.

Bias control can be achieved in any suitable manner. For example, in one embodiment, the bias controller includes a comparator, the comparator is operable to: compare the magnitude of the power supply voltage to the minimum bias threshold value; and activate switching circuitry in the primary stage in response to detecting that a magnitude of the power supply voltage substantially equals (crosses) the minimum bias threshold value, activation of the switching circuitry increasing a magnitude of the power supply voltage above the minimum bias threshold value, thus, preventing lockout.

In one embodiment, subsequent to the activation of the switching circuitry for a predetermined amount of time to bias the power supply voltage derived from the auxiliary winding (or other suitable resource), the bias controller deactivates the switching circuitry in the primary stage. Thus, although there may be no immediate need to convey energy from the primary winding to the secondary winding to maintain the output voltage in regulation due low current consumption by a load, the short burst of activating the switching circuitry sufficiently biases the power supply voltage so that it does not drop below a minimum threshold value.

Further embodiments herein include, during the second mode (low power consumption mode), maintaining the power supply voltage between a minimum as voltage level and a maximum bias voltage level. In one embodiment, maintenance of the power supply voltage between the minimum bias threshold value and the maximum bias threshold value has negligible or no impact on increasing a magnitude of the output voltage from the secondary stage.

As previously discussed, the bias controller can include a comparator. In one embodiment, the comparator is operable to compare the power supply voltage to a maximum bias threshold value as well. In response to detecting that the magnitude of the power supply voltage is substantially equal to or crosses the maximum bias threshold value, the bias controller deactivates the switching circuitry in the primary stage in response to detecting that the magnitude of the power supply voltage is substantially equal to the maximum bias threshold value.

Further, control of biasing the power supply voltage during light load conditions can be achieved in any suitable manner. For example, in one embodiment, the bias controller is operable to control a duration of activating switching circuitry (such as one or more switches) in the primary stage such that a magnitude of the power supply voltage is maintained to be less than a maximum bias threshold value; activation of the switching circuitry may convey a small portion of energy from the primary stage to the secondary stage. However, the small portion of energy may or may not cause in a change in a magnitude of the output voltage that powers a respective load.

In accordance with further embodiments, maintenance of the power supply voltage above the minimum bias threshold value during low power consumption by the load prevents the primary stage (and controller powered by the power supply voltage signal) from entering an undervoltage lockout mode in which the main controller is impeded or prevented from controlling the output voltage via control of the primary stage because it is not powered properly.

In yet further embodiments, as previously discussed, the voltage converter can be configured to include a transformer. The transformer includes a primary winding, auxiliary winding, and a secondary winding. The primary winding and the auxiliary winding of the transformer are disposed in the primary stage; the secondary winding of the transformer is disposed in the secondary stage. The auxiliary winding in the primary stage is operable to generate the power supply voltage. In certain conditions, as previously discussed, a magnitude of the power supply voltage varies depending on an amount of energy conveyed from the primary winding to the secondary winding to generate the output voltage.

In accordance with further embodiments, the secondary stage can be configured to include a feedback circuit (or generator) operable to communicate a control (feedback) to the primary stage, the feedback control signal can be configured to control activation of switch circuitry in the primary stage during a condition in which power consumption by the load is above a threshold level. The feedback from the secondary stage can be configured to control activation of the switch circuitry in the primary stage, resulting in conveyance of energy from the primary stage to the secondary stage. In one embodiment, when load is in a low power consumption mode, the secondary stage may only occasionally provide feedback to activate the switches in the primary stage to increase the output voltage, which also increases a magnitude of the power supply voltage generated by the primary winding. Thus, the secondary stage can cause an increase in a magnitude of the power supply voltage during fairly low (load) power consumption conditions.

As previously discussed, the bias controller as described herein operates to bias the power supply voltage during extreme conditions in which even the secondary stage does not initiate activation of switches in the primary stage. After the low load consumption condition and resumption of higher amounts of current by the load, activation of the switch circuitry under normal switching conditions naturally increases a magnitude of the power supply voltage sufficiently above the minimum bias threshold value such that the bias controller no longer needs to bias the power supply voltage above the minimum bias threshold value. Accordingly, the need to bias the power supply voltage via the bias controller can depend on an amount power or current consumed by the load.

Thus, embodiments herein include a bias controller operable to maintain the power supply voltage to be above the minimum bias threshold value during general deactivation of high side and low side switching circuitry in the primary stage. As previously discussed, activation of the switching circuitry in the primary stage conveys energy from the primary stage to the secondary stage to produce the output voltage. The deactivation of the switching circuitry in the primary stage is operable to terminate conveyance of energy from the primary stage to the secondary stage to generate the output voltage, in which case the bias controller serves as a watchdog to maintain the magnitude of the power supply voltage above a minimum threshold value or between a minimum threshold value and a maximum threshold value.

In accordance with further embodiments, the minimum bias threshold value is an adaptive threshold value based at least in part on a magnitude of the output voltage outputted from the second stage to power the load.

Embodiments herein are useful over conventional techniques. For example, in contrast to conventional techniques, the bias controller and related topology provide continued use of a voltage converter during large power consumption swings of a load. That is, biasing of the power supply voltage in a manner as described herein prevents the power supply voltage (such as generated from an auxiliary winding) and corresponding primary stage from entering an undervoltage lockout mode in which the controller is impeded from controlling the output voltage.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate signal biasing and corresponding control of a voltage converter to produce an output voltage that powers a load. The instructions, when executed by computer processor hardware, cause the computer processor hardware (such as one or more co-located or disparately located processor devices or hardware) to: receive a feedback signal;

regulate conveyance of energy from the primary stage to the secondary stage based on a magnitude of the received feedback signal, regulation of the conveyance controlling a magnitude of an output voltage outputted from the secondary stage to power a load; and maintain a power supply voltage (such as from the primary stage) to be above a bias threshold value during deactivation of switching circuitry, the deactivation terminating the conveyance of the energy from the primary stage to generate the output voltage.

Another embodiment includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: compare a received power supply voltage to a bias threshold value; activate switching circuitry in the primary stage of a voltage converter in response to detecting that a magnitude of the power supply voltage crosses (substantially equals) the bias threshold value, activation of the switching circuitry increasing a magnitude of the power supply voltage above the bias threshold value; and i) activate the switching circuitry for a predetermined amount of time or ii) in response to detecting a magnitude of the power supply voltage crossing (increasing above) a second threshold value (maximum bias threshold value), deactivating the switching circuitry in a primary stage of the voltage converter to prevent the power supply voltage from increasing above the second threshold value.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a voltage converter, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating computer architecture operable to execute one or more operations according to embodiments herein.

FIG. 6 is an example diagram illustrating a general method according to embodiments herein.

Figure 1:
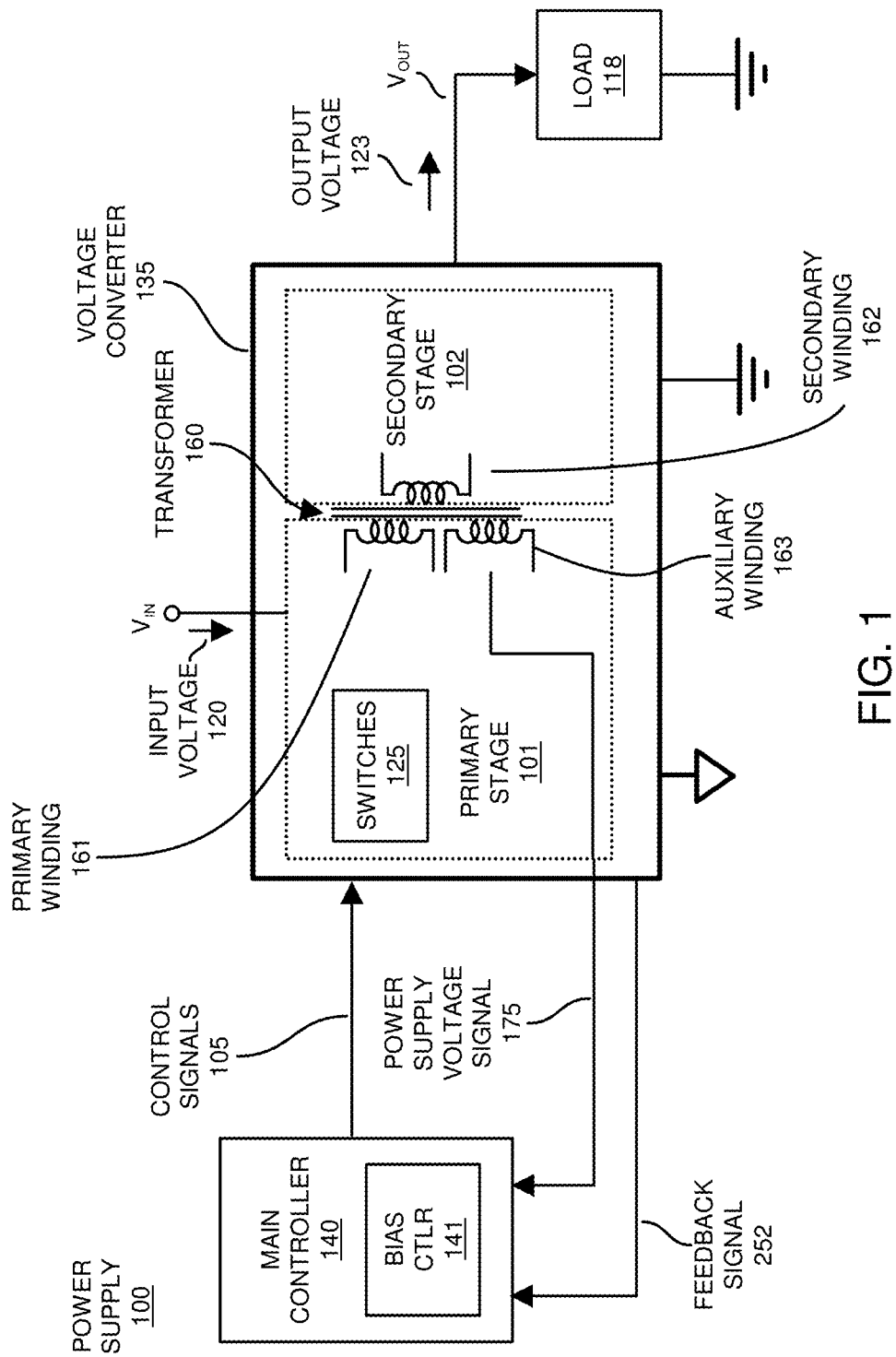
FIG. 1 is an example diagram illustrating a power supply including a main controller and bias controller according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

A power supply as described herein includes a voltage converter, main controller, and a bias controller. The voltage converter including a primary stage and a secondary stage. During operation, the controller is operable to control regulation of an output voltage from the secondary stage based on a power supply voltage produced in the primary stage. The output voltage outputted from the secondary stage powers a load. During certain load conditions, such as a low current consumption, the bias controller maintains (via novel biasing) a magnitude of the power supply voltage above a (minimum) bias threshold value or between a minimum bias threshold value and a maximum bias threshold value. In one embodiment, the bias controller is operable to prevent the power supply voltage from falling below the minimum bias threshold value (i.e., voltage value), preventing an under voltage condition of the power supply voltage such that the controller is able to quickly continue conveyance of sufficient energy from the primary stage to the secondary stage when the load increases a rate of consuming power provided by the output voltage. Additionally, during a low current consumption by the load, the bias controller prevents the power supply voltage from increasing above the maximum bias threshold value, preventing an increase in a magnitude of the of output voltage.

Now, more specifically, FIG. 1 is an example diagram illustrating a power supply including a power supply according to embodiments herein.

As shown in this example embodiment, power supply 100 (such as an apparatus, electronic device, etc.) includes a main controller 140 and a voltage converter 135. Voltage converter 135 produces the output voltage 123 that powers the load 118.

Main controller 140 includes bias controller 141. Alternatively, bias controller 141 is disparately located with respect to the main controller 140.

By further way of non-limiting example embodiment, voltage converter 135 includes a primary stage 101 and secondary stage 102. Voltage converter 135 further includes a respective transformer 160.

Transformer 160 includes a primary winding 161, secondary winding 162 and auxiliary winding 163. The combination of primary winding 161, secondary winding 162, and auxiliary winding 163 are magnetically coupled to each other.

In this example embodiment, the primary stage 101 includes one or more switches 125 that control operation of conveying energy received from the input voltage 120 through the primary winding 161 to the secondary winding 162 of the transformer 160.

In one embodiment, regulation of conveying the received energy from the input voltage 120 from the primary winding 161 to the secondary winding of secondary stage 102 results in generation of the output voltage 123 that powers a load 118. The regulation of conveying energy from the primary winding 161 to the secondary winding 162 maintains the magnitude of the output voltage 123 within a desired range to power load 118.

Note that each of the resources, components, modules, etc., as described herein can be instantiated in any suitable manner. For example, each of the main controller 140, bias controller 141, voltage converter 135, etc., can be instantiated as or include hardware (such as electronic circuitry), software (such as an executed set of instructions), or a combination of hardware and software resources.

Further, note that hardware embodiments and corresponding components, resources, etc., associated with the power supply 100 can be instantiated as digital circuitry, analog circuitry, or a combination of both analog/digital electronic circuitry.

In general, the feedback signal 252 received from the voltage converter 135 indicates a magnitude of the output voltage 123 and/or whether more energy is needed at the secondary winding 162 to maintain the output voltage 123 within proper regulation. During normal load conditions in which sufficient energy above a threshold value is conveyed from the primary winding 161 to the secondary winding, the auxiliary winding 163 receives enough energy to keep the magnitude of the power supply voltage 175 (potentially referred to as a bias voltage, voltage rail, etc.) above a threshold value to power the controller 140.

During certain load conditions (such as conditions in which the load 118 consumes only a low level of current from the output voltage 123) such as below a threshold value, a magnitude of the power supply voltage 175 is prone to decreasing to such a low magnitude that the main controller 140 (as indicated by feedback 252) no longer needs to activate one or more switches 125 to convey energy from the primary stage 101 to the secondary stage 102 to increase the magnitude of the output voltage 123.

In one embodiment, when the switches 125 are deactivated, the main controller 140 no longer conveys energy from the primary winding to the secondary winding to increase a magnitude of the output voltage, the magnitude of the power supply voltage 175 may fall at a faster rate than the output voltage 123 such as due to parasitic consumptions by components and/or circuitry in the voltage converter 135 and/or controller 140 itself that consumes power provided by the power supply voltage 175.

In certain instances, as previously discussed, it is undesirable that a magnitude of the power supply voltage 175 fall below a threshold value, Vth1. As described herein, the bias controller 141 prevents such a condition.

For example, in accordance with further embodiments, the bias controller 141 serves as a monitor or watchdog circuit that prevents the magnitude of the power supply voltage 175 from falling below a threshold value during low load conditions. That is, via novel biasing as further discussed herein, via generation of control signals 105, the bias controller 141 maintains a magnitude of the power supply voltage 175 (such as derived from an output of the auxiliary winding 163) above a bias threshold value, Vth1.

In accordance with further embodiments, the bias controller 141 is operable to prevent the power supply voltage 175 from falling below the minimum bias threshold value Vth1 such that the main controller 140 is able to quickly (because the controller 140 is powered by a healthy power supply voltage 175 when biased) communicate sufficient energy (received from the input voltage 120) from the primary stage 101 (a.k.a., primary side of voltage converter 135) to the secondary stage 102 (a.k.a., secondary side of voltage converter 135) when the load 118 suddenly increases (such as in response to a transient current consumption condition) a rate of consuming power provided by the output voltage 123. The bias controller 141 additionally prevents the power supply voltage 175 from increasing above a maximum bias threshold value, preventing an increase in a magnitude of the output voltage 123 and possible out-of-regulation condition in which the magnitude of the output voltage 123 may otherwise exceed a maximum allowable output value (which could damage the load 118).

More specific details of these embodiments are further discussed below.

Figure 2:
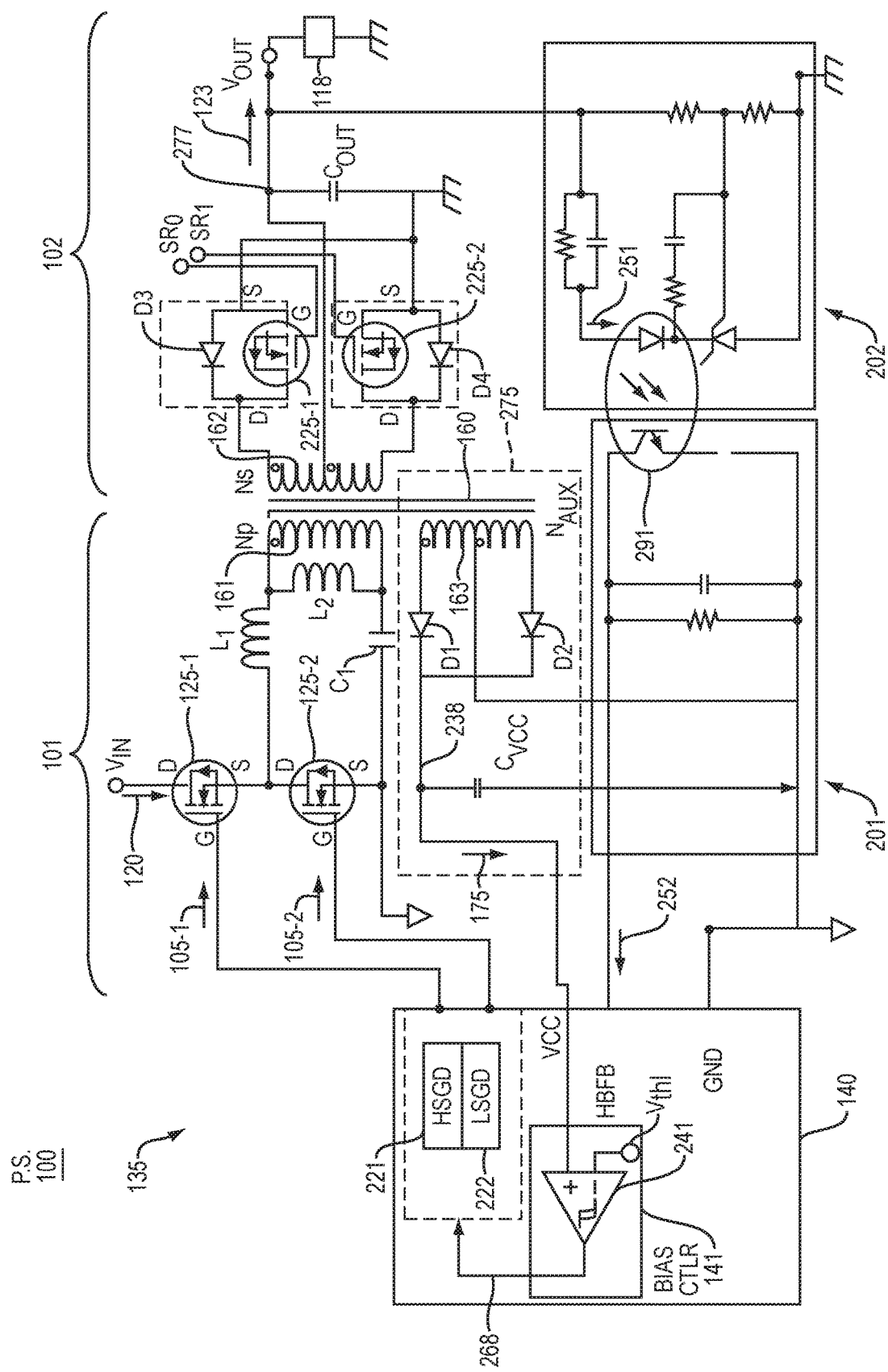
FIG. 2 is an example diagram illustrating a power supply according to embodiments herein.

FIG. 2 is an example diagram illustrating a power supply according to embodiments herein.

As shown in this more detailed embodiment, the power supply 100 includes main controller 140 as well as voltage converter 135.

Main controller 140 includes bias controller 141, as well as driver 221 and driver 222. In this example embodiment, bias controller 141 includes comparator 241.

As previously discussed, the voltage converter 135 includes a primary stage 101 and secondary stage 102. Driver 221 of the main controller 140 is coupled to drive and control the gate of switch 125-1 via control signal 105-1. The driver 222 of the main controller 140 is operable to drive and control the gate of switch 125-2 with the control signal 105-2.

Yet further in this example embodiment, the primary stage 101 includes the feedback circuit 201, monitor circuit 275, switch 125-1, switch 125-2, inductor L1, inductor L2, capacitor C1, primary winding 161, and auxiliary winding 163. The inductors L1 and L2 and capacitor C1 support resonant operation of the power supply 101. When the LLC circuit is not switching, both the high-side switch 125-1 and the low side switch 125-2 are OFF.

As further shown, the drain node of switch 125-1 is connected to the input voltage 120. The source node of switch 125-1 is connected to the drain node of switch 125-2. The source node of the switch 125-2 is connected to a ground reference voltage.

As yet further shown, the inductor L1 is coupled between the source node of switch 125-1 and the primary winding 161. Inductor L2 is connected in parallel across the primary winding 161. Capacitor C1 provides connectivity between the combination of inductor L2 and primary winding 161 and the source node of the switch 125-2, which is connected to a ground reference.

Monitor circuit 275 of the primary stage 101 includes diode D1, diode D2, auxiliary winding 163, and capacitor Cvcc. As shown, the diode D1 of the monitor circuit 275 is coupled between a first node or end of the auxiliary winding 163 and node 238. The diode D2 of the monitor circuit 275 is coupled between a second node or end of the auxiliary winding 163 and the node 238. Capacitor Cvcc is connected between node 238 and ground. Further, the node 238 is coupled to input node Vcc of the main controller 140.

Feedback circuit 202 receives the output voltage 123 and generates the feedback signal 251 conveyed to the opto-coupler 291. Feedback circuit 201 couples the optical coupler 291 to the HBFB node of the main controller 140. In one embodiment, the optical coupler 291 produces the feedback signal 252 (from feedback signal 251), which is fed through the feedback circuit 201 to the HBFB node of the main controller 140.

Secondary stage 102 further includes switch 225-1 driven by control signal SR0, switch 225-2 driven by control signal SR1, diode D3, diode D4, capacitor Cout, and feedback circuit 202.

As shown, the diode D3 is coupled in parallel between the drain node of switch 225-1 and the source node of switch node 225-1. The drain node of switch 225-1 is connected to the first end of the secondary winding 162. The source node of the switch 225-1 is connected to a second ground reference.

The diode D4 is coupled in parallel between the drain node of switch 225-2 and the source node of switch node 225-2. The drain node of switch 225-2 is connected to the second end of the secondary winding 162. The source node of the switch 225-2 is connected to the second ground reference.

The (center) tap node of the secondary winding 162 is coupled to the node 277. Capacitor Cout is coupled between the node 277 and the second ground reference voltage. Capacitor Cout stores the output voltage 123.

The feedback circuit 202 is coupled to the node 277 to monitor the output voltage 123. As previously discussed, the feedback circuit 202 generates signal 251 inputted to opto-coupler 291. Opto-coupler 291 converts the received signal 251 into a respective output feedback signal 252 conveyed to the HBFB node of the main controller 140.

Still further, as pictorially shown in FIG. 2, the transformer 160 provides coupling that supports conveyance of energy from the primary stage 101 to the secondary stage 102. As previously discussed, in a reverse direction, the optical coupler 291 provides a way to convey feedback 252 from the feedback circuit 202 to feedback circuit 201 and corresponding HBFB node of the main controller 140. In one embodiment, the feedback signal 252 indicates a magnitude of the output voltage 123; the controller 140 uses the feedback signal 252 as a basis to control switches 125 and maintain the magnitude of the output voltage 123 within a desired voltage range.

The power supply 100 includes a bias controller 141. Note that bias control (via bias controller 141 or other suitable resource) can be achieved in any suitable manner.

In one embodiment, the bias controller 141 includes one or more comparators such as a comparator 241.

The comparator 241 is operable to: compare the magnitude of the power supply voltage 175 to the threshold value Vth1 (such as a minimum bias threshold value). Via one or more bias control signals 268 outputted from the bias controller 141, the bias controller 141 activates switching circuitry 125 in the primary stage 101 in response to detecting that a magnitude of the power supply voltage 175 substantially equals or is less than the minimum bias threshold value Vth1.

For example, via generation of control signals 105, activation (toggling) of the switching circuitry (such as switch 125-1 and switch 125-2 switched between ON and OFF such as a first cycle in which switch 125-1 is ON and switch 125-2 is OFF; second cycle in which switch 125-1 is OFF and switch 125-2 is ON; third cycle in which switch 125-1 is ON and switch 125-2 is OFF; fourth cycle in which switch 125-1 is OFF and switch 125-2 is ON; and so on during the activation time) causes a flow of current from the input voltage 120 through the primary winding 161; the auxiliary winding 163 receives a portion of the energy, increasing a magnitude of the voltage 175 above the minimum bias threshold value Vth1. Note that deactivation of switch circuitry 125 means that both switch 125-1 and switch 125-2 are both set to OFF states. Further note that both switch 125-1 and switch 125-2 are never both simultaneously ON since this would short the source 120 (Vin) to the corresponding ground reference.

In one embodiment, subsequent to the activation (toggling as previously discussed) of the switching circuitry 125 for at least a short duration of time to bias the power supply voltage 175 derived from the auxiliary winding 163 (or other suitable resource), the bias controller 141 deactivates (shuts OFF both switches 125-1 and 125-2) the switching circuitry 125 in the primary stage 101. Thus, although there may be no immediate need to convey energy from the primary winding 161 to the secondary winding 162 to maintain the output voltage 123 in regulation (such as increase its magnitude), the short burst of activating the switching circuitry 125 sufficiently biases the voltage 175 so that it does not drop substantially below a minimum threshold value Vth1). In one embodiment, the power supply voltage 175 needs only loose regulation (must be above UVLO and below absolute maximum rating). Embodiments herein include controlling winding or turn ratio of the transformer 160 that keeping Naux*Vbias always below Ns*Vout, where Ns=number turns on the secondary winding 162 and Naux is the number of turns on the auxiliary winding 163; Vbias=Vcc or power supply voltage 175.

Note that, as an alternative to activating the switch circuitry 125 for a predetermined amount of time, further embodiments herein include, during a second mode of biasing the power supply voltage 175 (Vcc) during low consumption of current by the load 118, the bias controller 141 can be configured to maintain the power supply voltage 175 between a minimum voltage level (such as Vth1) and a maximum bias voltage level (Vth2) as further discussed below.

In one embodiment, maintenance of the power supply voltage 175 above the threshold value Vth1 or between the minimum bias threshold value Vth1 and the maximum bias threshold value Vth2 has negligible or no impact on increasing a magnitude of the output voltage 123 from the secondary stage 102.

Embodiments herein are useful over conventional techniques. For example, in contrast to conventional techniques, the bias controller and related topology provide continued use of a voltage converter during large power consumption swings of a load. That is, biasing of the voltage in a manner as described herein prevents the power supply voltage 175 (such as a voltage from an auxiliary winding) and corresponding primary stage from entering an undervoltage or lockout mode in which the controller is impeded from controlling the output voltage.

$$V_{OUT} = \frac{V_{IN} N_S}{2N_P} \qquad \text{equation 1}$$

$$V_{CC} = \frac{V_{IN} N_{AUX}}{2N_P} = \frac{V_{OUT} N_{AUX}}{N_S} \qquad \text{equation 2}$$

where Np=number of turns of the primary winding 161; Ns=number of turns of the secondary primary winding 162; Naux=number of turns of the auxiliary winding 163.

During switching with feedback regulation, Vout (output voltage 123) and Vcc (power supply voltage 175) are defined by the turns ratio (see Eq 1 and 2) of the transformer 160.

But during the burst phase, Vout and Vcc decrease depending on their loads

Then VCC may drop below its minimum "survive" or lockout level:

$$V_{OUT} = \frac{V_{IN} N_S}{2N_P} \qquad \text{equation 3}$$

$$V_{CC} = \frac{V_{IN} N_{AUX}}{2N_P} = \frac{V_{OUT} N_{AUX}}{N_S} \qquad \text{equation 4}$$

$$V_{NEW\text{-}OUT} = \frac{V_{CC} N_S}{N_{AUX}} = \frac{V_{CC\text{-}UVLO} N_S}{N_{AUX}} \qquad \text{equation 5}$$

After Vcc has dropped, switching operation via the bias controller 141 brings it back to a level well above the minimum "survive" (Vcc.uv-lo) level.

At the same time, the activation of the switch circuitry 125 will charge the output capacitor Cout only if the related "new" output voltage (Vnew.out) is above the present magnitude of the output voltage 123.

As long as "new" Vout (a.k.a., Vnew.out) is below the actual magnitude of the output voltage 123, only the voltage 175 of the capacitor Cvcc will be charged (increase in voltage magnitude). Thus, the number of turns associated with each winding can be used to facilitate biasing of the voltage 175.

Example: NAUX/NS=1.33, VOUT=12VV,"VCC"=16V, Now if VCC=15V, VNEW.OUT=15V/1.33=11.27V<12V, thus there is no increase in the output voltage 123.

In this example embodiment, the controller 140 provides Vcc (power supply voltage 175) generation without a significant side-effect (such as needlessly increasing a magnitude of the output voltage 123, when the load 118 does not consume sufficient current to warrant further charging of capacitor Cout).

Figure 3:
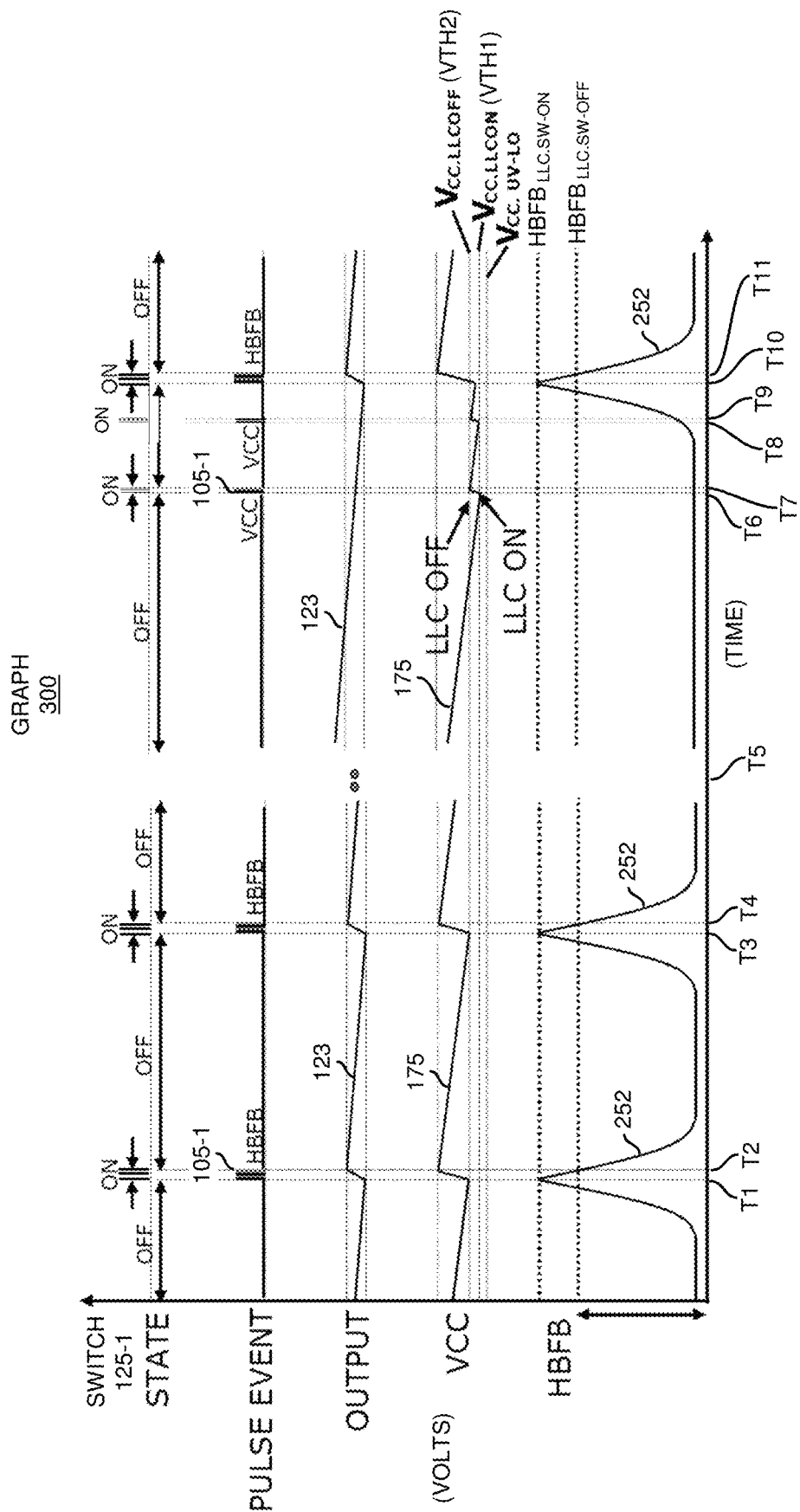
FIG. 3 is an example diagram illustrating a timing diagram of operating a voltage converter in multiple modes according to embodiments herein.

FIG. 3 is an example diagram illustrating a timing diagram of operating a voltage converter in multiple modes according to embodiments herein.

Graph 300 illustrates control of conveying energy from the primary winding 161 to the secondary winding 162 to maintain the output voltage 123 in a first mode and biasing of the voltage 175 (Vcc) during a second mode according to embodiments herein.

During the first mode (such as between time T1 and time T5) in which the load 118 consumes power from the output voltage 123 (such as above a threshold consumption level), the magnitude of the voltage 175 is operable to ratiometrically track the magnitude of the output voltage 123 depending on a number of turns in the windings of the transformer 160.

As previously discussed, the controller 140 receives the feedback 252 from the secondary stage 102. Specifically, in this example embodiment, the controller 140 receives the feedback 252 at the HBFB node of the controller 140.

In response to detecting that a magnitude of the signal HBFB increases to a threshold value of $HBFB_{LLC\ SW\text{-}ON}$ at time T1, the controller 140 initiates activation of the switch circuitry 125 to an ON state via pulsing of the control signal 105-1 and 105-2 (one or more times) between or around time T1 and T2. As previously discussed, during activation of switch circuitry 125, via control signals 105-1 and 105-2, switch 125-1 is ON while switch 125-2 is OFF; switch 125-1 is controlled OFF when switch 125-2 is controlled ON (see above example of activation). Note that the control signal 105-1 and control signal 105-2 between time T1 and T2 can include one or more pulses (such as high and low side burst pulses) depending on the embodiment.

As further shown, activation of the switches 125-1 and 125-2 in a manner as previously discussed at different times between time T1 and T2 causes both the output voltage 123 to increase in magnitude as well as causes an increase in the magnitude of the voltage 175 (Vcc).

In a similar manner, during the first mode, between time T3 and T4, based on received feedback signal 252, the controller 140 initiates activation of the control switch circuitry 125 to an ON state via pulsing of the control signal 105-1 and control signal 105-2 between time T3 and T4.

Conversely, during a second mode (such as between time T5 and T9) in which the load 118 consumes very little power (or current) supplied from the output voltage 123 (such as below a threshold level), the bias controller 141 is operable to apply a bias to the power supply voltage 175 to maintain the magnitude of the voltage 175 above the minimum bias threshold value Vth1.

More specifically, during the second mode after time T5, the main controller 140 receives the feedback 252. However, in this example embodiment, the feedback 252 does not cause the main controller 140 to apply a pulses to the switch circuitry 125; thus, the magnitude of the feedback 252 does not raise above the threshold value $HBFB_{LLC\ SW\text{-}ON}$ between time T6 and T9. However, as previously discussed, the bias controller 141 compares the voltage 175 to the voltage threshold Vth1. In response to detecting that a magnitude of the voltage 175 (at node Vcc) crosses (substantially equals or is about to fall below) the minimum threshold value Vth1, the bias controller 141 initiates activation of the switch circuitry 125 to an ON state at or around time T6 via pulsing of the control signals 105-1 and 105-2.

In one embodiment, the bias controller 141 also compares the power supply voltage 175 to a voltage threshold Vth2 (such as a maximum threshold value). In response to detecting that a magnitude of the power supply voltage 175 (at node Vcc of the main controller 140) increases such as crosses the maximum threshold value Vth2, the bias controller 141 initiates deactivation of the control switch circuitry 125 to an OFF state via termination of pulsing of the control signal 105-1 and 105-2 at around time T7. Thus, the bias controller 141 initiates a burst of activating the switch circuitry 125 between time T6 and T7 to maintain the power supply 175 above a minimum threshold value.

As mentioned, activating the control signal 1051 and 105-2 between time T6 and T7 can include one or more pulses (such as high burst pulses) depending on the embodiment.

As further shown, activation of the switch circuitry 125 between time T6 and T7 causes the power supply voltage 175 (such as Vcc) to increase in magnitude; however, there is no change to the magnitude of the power supply voltage 175 (Vcc) because the voltage at the secondary winding is less than the current magnitude of the output voltage 123.

In a typical BM (Burst Mode) fixed ripple controller, the HBFB node is able to setup a LLC switching off threshold. When Vcc (power supply voltage 175) drops to below than $V_{CC.LLCON}$ threshold (Vth1), the controller 141 initiates LLC switching with respect to primary winding 161 to avoid a lockout mode that occurs when the power supply voltage 175 otherwise falls below the lockout voltage $V_{CC.UV-LO}$. Later, the bias controller 141 discontinues LLC (resonance) with respect to the primary winding 161 due to the increase in magnitude of the power supply voltage 175 (Vcc) above the $V_{CC.LLCOFF}$ threshold (Vth2). In one embodiment, as long as the related VOUT.NEW is below a magnitude of the output voltage 123, the controller provides Vcc regulation without a side-effect to the output voltage 123. Note that $V_{CC.LLCON}$ and $V_{CC.LLCOFF}$ threshold can be the same or different threshold value settings.

Figure 4:
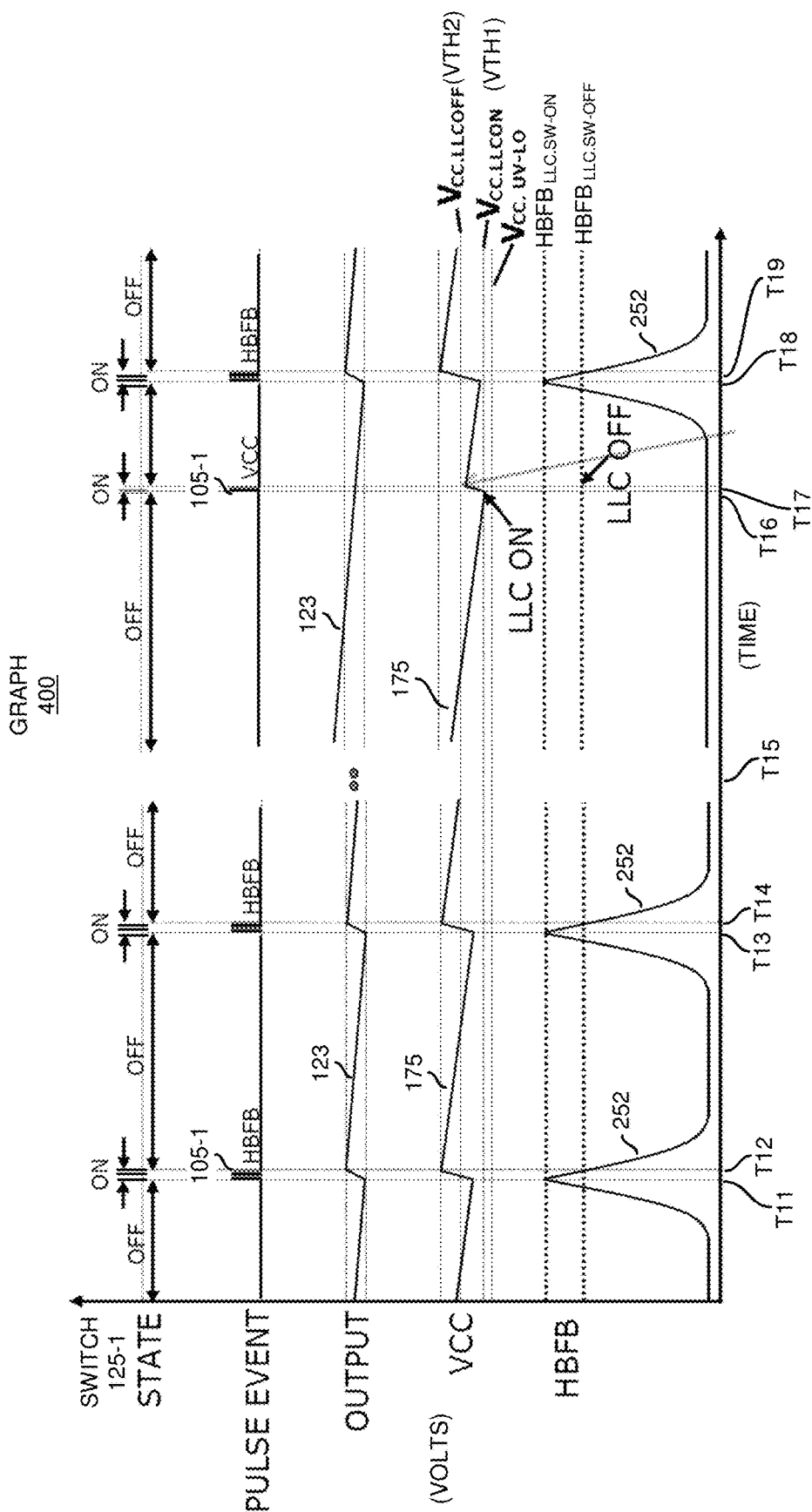
FIG. 4 is an example diagram illustrating a timing diagram of operating a voltage converter in multiple modes according to embodiments herein.

FIG. 4 is an example diagram illustrating a timing diagram of operating a voltage converter in multiple modes according to embodiments herein.

Graph 400 illustrates control of conveying energy from the primary winding 161 to the secondary winding 162 to maintain the output voltage 123 during a first mode and biasing of the power supply voltage 175 (Vcc) during a second mode according to embodiments herein.

During the first mode (such as between time T11 and time T15) in which the load 118 consumes power from the output voltage 123 above a threshold level, as shown, the magnitude of the power supply voltage 175 is operable to ratiometrically track the magnitude of the output voltage 123 depending on a number of turns in the windings of the transformer 160.

In a similar manner as previously discussed, the controller 140 receives the feedback 252 from the secondary stage 102. Specifically, the main controller 140 and bias controller 141 receive the feedback 252 at the HBFB node of the controller 140.

In response to detecting that a magnitude of the feedback 252 signal at node HBFB increases to a threshold value of $HBFB_{LLC\ SW-ON}$, the controller 140 initiates activation of the switch circuitry 125 to an ON state via pulsing of the control signals 105-1 and 105-2 between time T11 and T12. Note that the control signals 105-1 and 105-2 between time T11 and T12 can include one or more pulses (such as high and low side burst pulses) depending on the embodiment.

As shown, activation of the switch circuitry 125 between time T11 and T12 causes both the output voltage 123 to increase in magnitude as well as causes an increase the magnitude of the voltage 175 (Vcc).

In a similar manner, during the first mode, between time T13 and T14, the controller 140 initiates activation of the switch circuitry 125 to an ON state via pulsing of the control signals 105-1 and 105-2 between time T13 and T14 based on the feedback signal 252.

Conversely, during a second mode (such as between time T15 and T18) in which the load 118 consumes very little power (or current) supplied from the output voltage 123 (such as below a consumption threshold level), the bias controller 141 is operable to apply a bias to the power supply voltage 175 to maintain the magnitude of the power supply voltage 175 above the minimum bias threshold value Vth1 ($V_{CC.LLC-ON}$), which is above the undervoltage lockout threshold value $V_{CC.UV-LO}$. (which would prevent further operation of the voltage converter 135 due to the power supply entering a lockout mode).

More specifically, during the second mode, via feedback circuit 202 and feedback circuit 201, the controller 140 receives the feedback 252 from the secondary stage 102. However, in this example embodiment, between time T15 and T17, the feedback 252 does not cause the main controller 140 to apply high and low side burst of pulses to the switch circuitry 125 because the feedback 252 does not raise above the threshold value $HBFB_{LLC\ SW-ON}$ between time T15 and time T17. However, during such time after time T15, the bias controller 141 compares a magnitude of the power supply voltage 175 to the voltage threshold Vth1 ($V_{CC.LLC-ON}$).

In response to detecting that a magnitude of the power supply voltage 175 (at node Vcc) crosses (substantially equals or is about to fall below) the minimum threshold value Vth1 ($V_{CC.LLC-ON}$), the bias controller 141 initiates activation of the switch circuitry 125 to an ON state via pulsing of the control signals 105-1 and 105-2 at around time T16. In this example embodiment, instead of comparing the power supply voltage 175 to a second voltage threshold Vth2 (such as a maximum threshold value) to terminate pulsing of the switch circuitry 125, the bias controller 141 maintains activation of the switch circuitry 125 for a predetermined amount of time with respect to switch activation time T16.

In response to detecting expiration of the predetermined amount of time at time T17, the bias controller 141 terminates activation of the control switch circuitry 125 to an OFF state via termination of pulsing of the control signals 105-1 and 105-2 at around time T17. Thus, the bias controller 141 initiates a burst of activating the switch circuitry 125 between time T16 and T17 to bias the power supply voltage 175 (Vcc).

Note that the control signal 105-1 and 105-2 between time T16 and T17 can include one or more pulses (such as high and low side burst of pulses) depending on the embodiment.

As further shown in graph 400, activation of the switch circuitry 125 between time T16 and T17 causes the power supply voltage 175 to increase in magnitude; however, there is no change to the magnitude of the output voltage 123 because the voltage at the secondary winding 162 is less than the current magnitude of the output voltage 123.

Thus, in a typical BM (Burst Mode) fixed ripple controller, the HBFB node of the main controller 140 can setup an LLC switching off threshold. When Vcc drops to below the $V_{CC.LLCON}$ threshold, the controller 141 initiates LLC switching (burst of pulses) for a predetermined (or minimum amount of time). Later, after termination, resonance operation of the LLC circuit stops due to the increase in magnitude of the voltage 175 (Vcc) above the $V_{CC.LLCOFF}$ threshold. In one embodiment, as long as the related VOUT.NEW is below a magnitude of the output voltage 123, the controller provides Vcc regulation (of the power supply voltage 175) without a side-effect to the output voltage 123. Note that $V_{CC.LLCON}$ and $V_{CC.LLCOFF}$ threshold can be the same or different threshold value setting.

As previously discussed, embodiments herein are useful over conventional techniques. For example, the combination of controlling the voltage converter 135 to provide regulation of the output voltage 123 (during a first mode of normal range current consumption) and controlling biasing of the power supply voltage 175 above a threshold value Vth1 (during a second mode of very low current consumption by the load 118) ensures that the voltage converter 135 avoids a lockout condition during the low current consumption mode. Controlling biasing of the power supply voltage 175 below a threshold value Vth2 (during the second mode of very low current consumption by the load 118) ensures that the output voltage 123 does not needlessly increase during the low current consumption mode. The low power consumption of biasing the power supply voltage 175 provides higher efficiency power conversion using a simple circuit.

FIG. 5 is an example block diagram of a computer system for implementing any of the operations as previously discussed according to embodiments herein.

Any of the resources (such as main controller 140, bias controller 141, voltage converter 135, etc.) as discussed herein can be configured to include computer processor hardware and/or corresponding executable instructions to carry out the different operations as discussed herein.

As shown, computer system 550 of the present example includes an interconnect 511 operable to couple computer readable storage media 512 such as a non-transitory type of media (which can be any suitable type of hardware storage medium in which digital information can be stored and retrieved), a processor 513 (computer processor hardware), I/O interface 514, and a communications interface 517.

I/O interface(s) 514 supports connectivity to repository 580.

Computer readable storage medium 512 can be any hardware storage device such as memory, optical storage, hard drive, floppy disk, etc. In one embodiment, the computer readable storage medium 512 stores instructions and/or data.

As shown, computer readable storage media 512 can be encoded with controller application 140-1 (e.g., including instructions) to carry out any of the operations as discussed herein.

During operation of one embodiment, processor 513 accesses computer readable storage media 512 via the use of interconnect 511 in order to launch, run, execute, interpret or otherwise perform the instructions in controller application 140-1 stored on computer readable storage medium 512. Execution of the controller application 140-1 produces controller process 140-2 to carry out any of the operations and/or processes as discussed herein.

Those skilled in the art will understand that the computer system 550 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 550 may reside at any location or can be included in any suitable resource in any network environment to implement functionality as discussed herein.

Functionality supported by the different resources will now be discussed via flowchart in FIG. 6. Note that the steps in the flowcharts below can be executed in any suitable order.

FIG. 6 is a flowchart 600 illustrating an example method according to embodiments herein. Note that there will be some overlap with respect to concepts as discussed above.

In processing operation 610, the main controller 140 receives a power supply voltage 175 from a primary stage 101 of a voltage converter 135.

In processing operation 620, the main controller 140 regulates conveyance of energy from the primary stage 101 (such as primary winding 161) to the secondary stage 102 (such as secondary winding 162) based on a magnitude of the feedback voltage signal 252. Regulation of the conveyance of energy at least in part controls a magnitude of the output voltage 123 outputted from the secondary stage 102 to power a load 118.

In processing operation 630, the bias controller 141 maintains the power supply voltage 175 to be above a bias threshold value (such as threshold value Vth1) during low current consumption mode by the load 118, such as when the switches 125 in the primary stage 101 of the voltage converter 135 are deactivated, which terminates or substantially reduces conveyance of the energy from the primary stage 101 to the secondary stage 102 to generate the output voltage 123. Because there is no need to convey energy from the primary winding 161 to the secondary winding 162 when in the low current consumption mode, as further discussed below, a magnitude of the power supply voltage 175 is monitored and prevented from falling below a threshold value.

In sub-processing operation 632 associated with processing operation 630, to maintain the power supply voltage 175 above a minimum threshold value Vth1, the bias controller 141 compares a magnitude of the power supply voltage 175 to the bias threshold value Vth1.

In sub-processing operation 634 associated with processing operation 630, the bias controller 141 activates the switching circuitry 125 in the primary stage 101 in response to detecting that a magnitude of the power supply voltage 175 crosses or substantially equals the bias threshold value Vth1; activation of the switching circuitry 125 increases a magnitude of the power supply voltage 175 above the bias threshold value Vth1.

In sub-processing operation 634 associated with processing operation 630, subsequent to activation of the switching circuitry 125 for a predetermined amount of time, or detecting that a magnitude of the power supply voltage 175 crosses a second threshold value (maximum bias threshold value Vth2), the bias controller 141 deactivates the switching circuitry 125 in the primary stage 101 to prevent the power supply voltage 175 from increasing above the second threshold value Vth2. In one embodiment, as previously discussed, activation of the switch circuitry 125 is sufficiently short in duration when in the bias mode such that activation of switch circuitry 125 has negligible impact or no impact on increasing a magnitude of the output voltage 123.

Note again that techniques herein are well suited for use in power supply applications. However, it should be noted that embodiments herein are not limited to use in such applications and that the techniques discussed herein are well suited for other applications (such as flyback, forward, half-bridge LLC, and full-bridge power supply architectures, etc.) as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a voltage converter including a primary stage and a secondary stage;
a main controller powered by a power supply voltage, the main controller operable to control regulation of an output voltage from the secondary stage based on a feedback voltage signal, the output voltage outputted from the secondary stage to power a load; and
a bias controller operable to monitor a magnitude of the power supply voltage and, via activation of switch circuitry in the primary stage in response to the power supply voltage being below a bias threshold value, maintain the magnitude of the power supply voltage above the bias threshold value.

2. The apparatus as in claim 1, wherein the primary stage includes a primary winding and an auxiliary winding, the auxiliary winding operable to generate the power supply voltage; and
wherein during a first mode in which the load consumes power above a current consumption threshold level, the magnitude of the power supply voltage is operable to track the magnitude of the output voltage.

3. The apparatus as in claim 2, wherein the bias controller, during a second mode in which the load consumes power from the output voltage below the current consumption threshold level, is operable to bias the power supply voltage to maintain the magnitude of the power supply voltage above the bias threshold value, the bias threshold value being a minimum bias threshold value.

4. The apparatus as in claim 1, wherein the bias controller includes a comparator, the comparator operable to:
compare the magnitude of the power supply voltage to the bias threshold value; and
activate the switch circuitry in the primary stage in response to detecting that a magnitude of the power supply voltage substantially equals or is below the bias threshold value, activation of the switch circuitry increasing a magnitude of the power supply voltage above the bias threshold value.

5. The apparatus as in claim 4, wherein the comparator is further operable to, subsequent to the activation of the switch circuitry for a predetermined amount of time, deactivate the switch circuitry in the primary stage.

6. The apparatus as in claim 4, wherein the controller is further operable to:
compare the power supply voltage to the maximum bias threshold value; and
deactivate the switch circuitry in the primary stage in response to detecting that the magnitude of the power supply voltage is substantially equal to or above the maximum bias threshold value.

7. The apparatus as in claim 6, wherein the maximum bias threshold value is an adaptive threshold value based at least in part on a magnitude of the output voltage.

8. The apparatus as in claim 1, wherein the bias threshold value is a minimum bias threshold value; and
wherein maintenance of the power supply voltage between the bias threshold value and a maximum bias threshold value has negligible impact on increasing a magnitude of the output voltage from the secondary stage.

9. The apparatus as in claim 1, wherein the bias threshold value is a minimum bias threshold value; and
wherein the bias controller is operable to control a duration of activating the switch circuitry in the primary stage such that a magnitude of the power supply voltage is maintained to be less than a maximum bias threshold value, activation of the switch circuitry conveying energy from the primary stage to the secondary stage.

10. The apparatus as in claim 1, wherein maintenance of the power supply voltage above the bias threshold value during low power consumption by the load prevents the primary stage from entering an undervoltage lockout mode in which the main controller is impeded from controlling the output voltage via control of the primary stage.

11. The apparatus as in claim 1 further comprising:
a transformer including a primary winding, auxiliary winding, and a secondary winding;
wherein the primary winding and the auxiliary winding of the transformer are disposed in the primary stage; and
wherein the secondary winding of the transformer is disposed in the secondary stage.

12. The apparatus as in claim 11, wherein the auxiliary winding in the primary stage is operable to generate the power supply voltage, a magnitude of the power supply voltage varying depending on an amount of energy conveyed from the primary winding to the secondary winding to generate the output voltage.

13. The apparatus as in claim 1, wherein the secondary stage includes a feedback circuit operable to communicate a control signal to the primary stage, the control signal controlling activation of the switch circuitry in the primary stage during a condition in which power consumption by the load is above a threshold level; and
wherein activation of the switch circuitry via the control signal: i) conveys energy from the primary stage to the secondary stage, and ii) increases a magnitude of the power supply voltage sufficiently above the bias threshold value.

14. The apparatus as in claim 1, wherein the bias controller is operable to maintain the power supply voltage to be above the bias threshold value during deactivation of the switch circuitry in the primary stage, the deactivation of the switch circuitry in the primary stage operable to terminate conveyance of energy from the primary stage to the secondary stage to generate the output voltage.

15. The apparatus as in claim 1, wherein the bias controller is operable to, via control of the switch circuitry, activate a resonant circuit in the primary stage to maintain the magnitude of the power supply voltage above the bias threshold value.

16. The apparatus as in claim 15, wherein the bias controller is operable to activate the resonant circuit in the primary stage to maintain the magnitude of the output voltage within regulation.

17. The apparatus as in claim 15, wherein both the bias controller and the main controller are operable to activate the resonant circuit in the primary stage at different times.

18. The apparatus as in claim 1, wherein the bias controller and the main controller independently control operation of the switch circuitry in the primary stage at different times to control regulation of the output voltage and maintain the magnitude of the power supply voltage above the bias threshold value.

19. The apparatus as in claim 1, wherein the bias controller is operable to activate a resonant circuit in the primary stage in response to detecting that the power supply voltage is below the bias voltage threshold value, activation of the resonant circuit increasing a magnitude of the output voltage and the magnitude of the power supply voltage.

20. The apparatus as in claim 1, wherein the primary stage includes a resonant circuit, the resonant circuit including a primary winding through which energy passes to a secondary winding that produces the output voltage; and
wherein the bias controller controls current flow through the primary winding.

21. The apparatus as in claim 20 further comprising:
an auxiliary winding magnetically coupled to the primary winding, the auxiliary winding operable to produce the power supply voltage based on the current flow.

22. The apparatus as in claim 1, wherein the bias controller is further operable to regulate the magnitude of the bias voltage via control of current through a primary winding of the primary stage.

23. The apparatus as in claim 22, wherein the primary winding is magnetically coupled to a secondary winding that produces the output voltage.

24. The apparatus as in claim 23 further comprising:
an auxiliary winding magnetically coupled to the primary winding, the auxiliary winding producing the power supply voltage.

25. A method of producing an output voltage from a voltage converter including a primary stage and a secondary stage, the method comprising:
receiving a power supply voltage that powers a controller;
via the controller, regulating conveyance of energy from the primary stage to the secondary stage based on a magnitude of a feedback signal, regulation of the conveyance controlling a magnitude of an output voltage outputted from the secondary stage to power a load; and
monitoring a magnitude of the power supply voltage; and
via controlled switching in the primary stage based on the magnitude of the power supply voltage with respect to a bias threshold value, maintain the power supply voltage to be above the bias threshold value.

26. The method as in claim 25, wherein maintaining the power supply voltage includes:
comparing the power supply voltage to the bias threshold value; and
activating switching circuitry in the primary stage in response to detecting that a magnitude of the power supply voltage substantially equals or is below the bias threshold value, activation of the switching circuitry increasing a magnitude of the power supply voltage above a first bias threshold value.

27. The method as in claim 26 further comprising:
subsequent to activation of the switching circuitry for a predetermined amount of time, deactivating the switching circuitry in the primary stage to prevent the power supply voltage from increasing above a second bias threshold value.

28. The method as in claim 27, wherein maintenance of the power supply voltage between the bias threshold value and the second bias threshold value has negligible impact on increasing a magnitude of the output voltage outputted from the secondary stage.

29. The method as in claim 26 further comprising:
deactivating the switch circuitry in the primary stage in response to detecting that the power supply voltage is substantially equal to or above a maximum bias threshold value.

30. Computer-readable storage hardware having instructions stored thereon, the instructions, when carried out by computer processor hardware, cause the computer processor hardware to:
receive a power supply voltage that powers a controller;
via the controller, regulate conveyance of energy from a primary stage to a secondary stage of a voltage converter based on a magnitude of a received feedback signal, regulation of the conveyance controlling a magnitude of an output voltage outputted from the secondary stage to power a load; and
monitor a magnitude of the power supply voltage and, via activation of switch circuitry in the primary stage in response to the monitored voltage being below a bias threshold value, maintain a magnitude of the power supply voltage to be above the bias threshold value.

* * * * *